United States Patent
Sakuramata et al.

(10) Patent No.: US 8,243,319 B2
(45) Date of Patent: Aug. 14, 2012

(54) IMAGE PROCESSING APPARATUS AND COMPUTER PROGRAM PRODUCT GENERATES AND DISPLAYED PROCESSED IMAGE IN A STACK

(75) Inventors: Yoshifumi Sakuramata, Tokyo (JP); Junichi Takami, Kanagawa (JP); Tetsuya Sakayori, Tokyo (JP); Iwao Saeki, Kanagawa (JP); Yoshinaga Kato, Kanagawa (JP); Bin Lu, Tokyo (JP); Toshio Miyazawa, Kanagawa (JP); Yu Sekiguchi, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 0 days.

(21) Appl. No.: 13/270,257

(22) Filed: Oct. 11, 2011

(65) Prior Publication Data

US 2012/0026529 A1  Feb. 2, 2012

Related U.S. Application Data

(63) Continuation of application No. 11/519,882, filed on Sep. 13, 2006, now Pat. No. 8,068,251.

(30) Foreign Application Priority Data

Sep. 14, 2005 (JP) ................. 2005-267165
Jul. 18, 2006 (JP) ................. 2006-196203

(51) Int. Cl.
G06K 15/00 (2006.01)
(52) U.S. Cl. ......... 358/1.17; 358/1.2; 358/1.18; 358/2.1
(58) Field of Classification Search .......... 715/200–277, 715/700–788
See application file for complete search history.

(56) References Cited

U.S. PATENT DOCUMENTS

| | | | |
|---|---|---|---|
| 5,030,947 A | 7/1991 | Dieudonne et al. |
| 6,262,732 B1 | 7/2001 | Coleman et al. |
| 7,586,630 B2 | 9/2009 | Shimizu |
| 7,889,405 B2 | 2/2011 | Takami et al. |
| 2002/0054172 A1 | 5/2002 | Berman et al. |
| 2002/0167546 A1 | 11/2002 | Kimbell et al. |
| 2003/0189602 A1 | 10/2003 | Dalton et al. |

(Continued)

FOREIGN PATENT DOCUMENTS

EP  1 505 483  2/2005

(Continued)

OTHER PUBLICATIONS

Office Action mailed on Jun. 28, 2011, in Japanese Patent Application No. 2006-196203 filed Jul. 18, 2006.

*Primary Examiner* — Benny Q Tieu
*Assistant Examiner* — Marcellus Augustin
(74) *Attorney, Agent, or Firm* — Oblon, Spivak, McClelland, Maier & Neustadt, L.L.P.

(57) ABSTRACT

A finished-image generating unit generates a finished image showing a result of a process performed on a target image according to various function setting items. A finished-image display unit, when the target image extends to a plurality of pages, forms the finished image in a stack, and displays the stacked finished image on a display unit with a page structure image that shows an overall page structure of the stacked finished image. A page moving unit, when one of the pages constituting the page structure image is specified via an operating unit, executes a page moving from a page currently displayed on the display unit to the specified page.

12 Claims, 12 Drawing Sheets

U.S. PATENT DOCUMENTS

| | | |
|---|---|---|
| 2004/0085364 A1 | 5/2004 | Keely et al. |
| 2004/0128261 A1 | 7/2004 | Olavson et al. |
| 2007/0058210 A1 | 3/2007 | Sakuramata et al. |

FOREIGN PATENT DOCUMENTS

| | | | |
|---|---|---|---|
| JP | 11-234503 | | 8/1999 |
| JP | 2001-125700 | | 5/2001 |
| JP | 2002-103726 | | 4/2002 |
| JP | 2003-5471 | | 1/2003 |
| JP | 2004-507808 | | 3/2004 |
| WO | 95-12193 | * | 5/1995 |
| WO | WO 95/12193 | | 5/1995 |
| WO | 02-06917 | * | 1/2002 |
| WO | WO 02/06917 A2 | | 1/2002 |

* cited by examiner

IMAGE PROCESSING APPARATUS AND COMPUTER PROGRAM PRODUCT GENERATES AND DISPLAYED PROCESSED IMAGE IN A STACK

CROSS-REFERENCE TO RELATED APPLICATIONS

This application is a continuation application of Ser. No. 11/519,882, filed Sep. 13, 2006 now U.S. Pat. No. 8,068,251. The present document incorporates by reference the entire contents of Japanese priority documents, 2005-267165 filed in Japan on Sep. 14, 2005, and 2006-196203 filed in Japan Jul. 18, 2006.

BACKGROUND OF THE INVENTION

1. Field of the Invention

The present invention relates to an image processing apparatus and a computer product.

2. Description of the Related Art

In using an image processing apparatus, such as a copier, fax machine, printer, and a multi function product (MFP) having combined functions of copying, faxing, printing, a user has to selects a function to execute from functions the image processing apparatus offers, and to make setting for desired functional contents. For example, the user needs to make setting on the condition of a document, such as the type and the density of the document, on various image processes, such as zoom, single-side/double-side printing, and margin size adjustment, and on postprocessing, such as sorting, stapling, and punching.

A conventional image processing apparatus provides enormous numbers of setting items and a plurality of setting contents for each item to allow a user to execute a variety of setting. The user, who wants to obtain a desired result, selects a type of setting out of those enormous setting items and contents.

The user, however, has no way to know what kind of a process result to receive according to setting contents in using the conventional image processing apparatus. For example, the user has to wait for actual print-out from the image processing apparatus to know a print result for the user. The obtained print result often ends up in a kind of finished product that the user does not expect to get.

To solve the above problem, some apparatuses and systems have been proposed, which include a preview display apparatus (see, for example, Japanese Patent Application Laid-Open No. 2003-5471) that displays a preview image showing the state of a printed result, an image processing apparatus (see, for example, Japanese Patent Application Laid-Open No. 2002-103726) that displays a preview image showing image data printed on a paper corresponding to selected paper image data when the paper image data to express a paper style of a different paper quality is selected, and an image forming system (see, for example, Japanese Patent Application Laid-Open No. 1999-234503) that displays a preview image of data made by synthesizing a plurality of edited and processed image data.

These conventional techniques offer a function of only displaying a preview of a single image, or an image synthesized from a plurality of images, that shows the result of image processes executed according to setting contents.

A user checks such preview images to make setting again for correction, which allows the user to perform setting operation while checking an image for a finished condition before proceeding to a print-out process, and finally obtain desired image output.

Those conventional techniques, however, have such a disadvantage in usability that a paging operation is required to turn pages one by one to find the overall structure of an image consisting of a plurality of pages or to find a specific image to check when the image consists of a number of pages of images, because each of the above conventional techniques features only the function of displaying a preview of a single image or an image synthesized from a plurality of images that shows the result of image processes executed according to setting contents.

In actual work of finding an object page in an image file consisting of a plurality of pages displayed on a display unit, a user often desires to find such a specific page that bears the turn of chapters or diagrams. A conventional method, however, forces the user to turn pages one by one to find the specific page. This costs the user a lot of trouble and time when the object page is separated far from a page to start turning, thus poses a problem that check work is cumbersome and inefficient.

SUMMARY OF THE INVENTION

It is an object of the present invention to at least partially solve the problems in the conventional technology.

An image processing apparatus according to one aspect of the present invention includes a finished-image generating unit that generates a finished image showing a result of a process performed on a target image according to various function setting items; a finished-image display unit that, when the target image extends to a plurality of pages, forms the finished image in a stack, and displays the stacked finished image on a display unit with a page structure image that shows an overall page structure of the stacked finished image; and a page moving unit that, when one of the pages constituting the page structure image is specified via an operating unit, executes a page moving from a page currently displayed on the display unit to the specified page.

A computer program product according to another aspect of the present invention includes a computer usable medium having computer readable program codes embodied in the medium that when executed causes a computer to execute generating a finished image showing a result of a process performed on a target image according to various function setting items; finished-image displaying including, when the target image extends to a plurality of pages, forming the finished image in a stack, and displaying the stacked finished image on a display unit with a page structure image that shows an overall page structure of the stacked finished image; and executing, when one of the pages constituting the page structure image is specified via an operating unit, a page moving from a page currently displayed on the display unit to the specified page.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. Since the embodiments to be described below are provided as the preferred embodiments according to the present invention, various limitations preferable in terms of technical purposes are added to the embodiments. The scope of the present invention, however, is not limited to the description of the embodiments to follow unless the following description presents any particular statement that limits the scope of the invention.

A first embodiment of the present invention represents a case where an MFP is used as an image processing apparatus. The MFP has combined functions of copying, faxing, printing, scanning, and of distributing an input image (read document image given by a scanner function, input image given by a printer or fax function, etc.).

Figure 1:
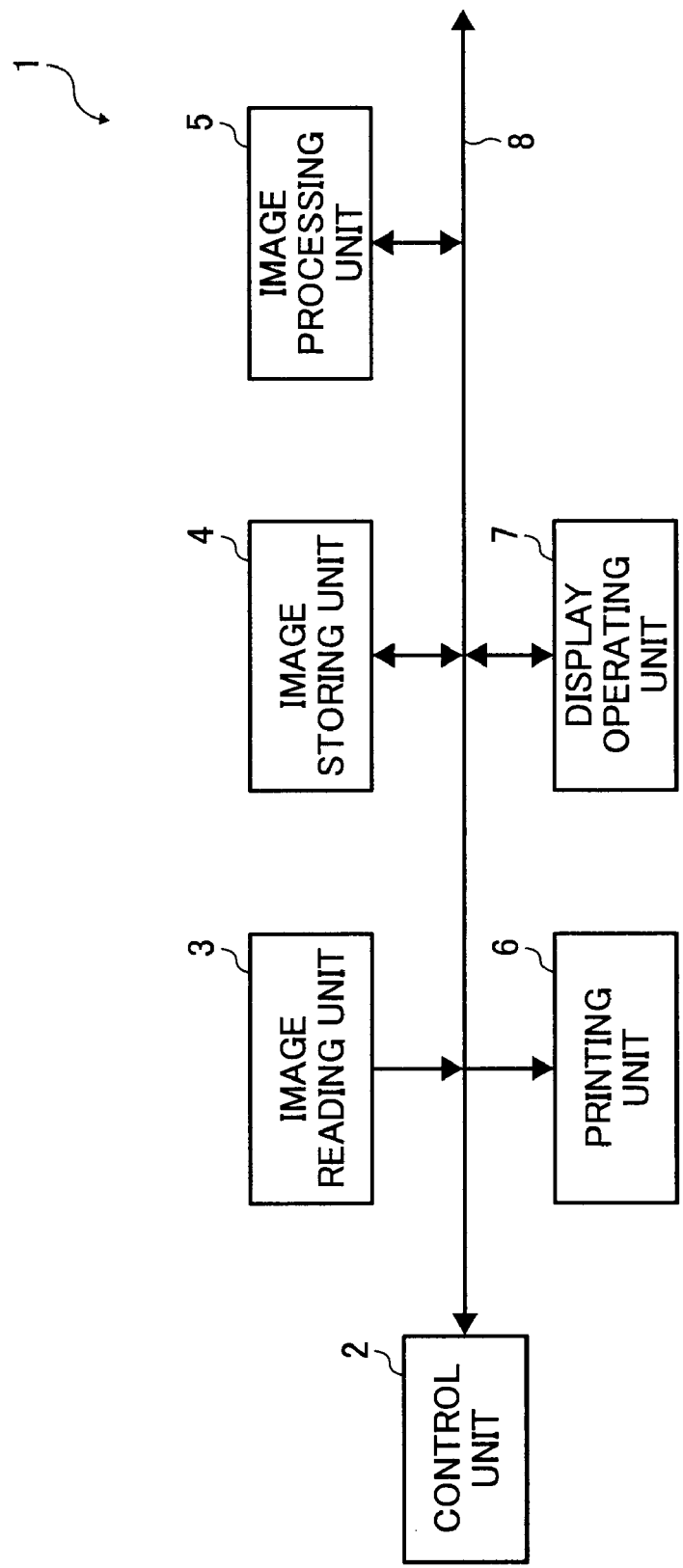
FIG. 1 is a block diagram of the main components of an image processing apparatus according to a first embodiment of the present invention.

Each of FIGS. 1 to 14 is a graphic diagram of the first embodiment of the image processing apparatus according to the present invention. FIG. 1 is a block diagram of the main components of an image processing apparatus 1 to which the first embodiment of the image processing apparatus according to the present invention is applied.

As shown in FIG. 1, the image processing apparatus 1 includes a control unit 2, an image reading unit 3, an image storing unit 4, an image processing unit 5, a printing unit 6, and a display operating unit 7. Each unit is interconnected via a bus 8. The image processing apparatus 1 can be used as a fax machine, copier, printer, compound machine, etc.

The control unit 2 includes a central processing unit (CPU), a read only memory (ROM), and a random access memory (RAM). The CPU controls each unit of the image processing apparatus 1 on the basis of programs stored in the ROM, using the RAM as a work memory, and executes processes to be carried out by the image processing apparatus 1, and also executes a finished image display process and a paging operation process, which will be described later.

The image reading unit 3 reads an image on a document by emitting light on the document on transfer or standing still and causing a photoelectric conversion element, such as a charge coupled device (CCD), to photoelectrically convert reflected light from the document. When the image reading unit 3 is provided with an automatic document feeder (ADF), the image reading unit 3 reads an image on a document sent to the image reading unit 3 as documents are set on the ADF and are transferred to the image reading unit 3 one by one.

The image storing unit 4 consists of a hard disc (HD) or a large-capacity RAM, etc., and stores document image data, which is read by the image reading unit 3, and image data, which is processed by the image processing unit 5, in the form of image files on a file-to-file basis.

The image processing unit 5 exerts a hardware function using an image-processing large-scale integrated-circuit (LSI) or exerts a software function using an image processing program to execute various image processes on image data stored in the image storing unit 4. The image processes include, for example, such image quality adjusting processes as zoom and sharpness adjustment. Particularly, under control by the control unit 2, the image processing unit 5 executes a finished image making process in accordance with setting contents set at the display operating unit 7, which will be described later.

The printing unit 6 has, for example, an engine unit that prints out an image on a paper by an electrophotographic method, and a post-processing device that carries out a post-process of punching, stapling, etc. on the paper bearing the image printed by the engine unit. Based on image data having undergone a final image process by the image processing unit 5, the engine unit of the printing unit 6 prints out an image on a paper, print-out being carried out in a print condition according to setting contents set at the display operating unit 7. The post-processing unit of the printing unit 6 carries out a post-process on the paper bearing the printed image, the post-process being carried out in a post-process condition according to process setting made at the display operating unit 7. The engine unit may employ various printing methods other than the electrophotographic method, such as ink-jet method, sublimation-type heat transfer method, silver salt photographic method, direct thermographic method, and melt-type heat transfer method.

The display operating unit (operating unit, display unit) 7 has a variety of operating keys necessary for operating the image processing apparatus 1, and a display screen (display unit) 7a, which consists of, for example, a crystal display. A touch panel is arranged on the display screen 7a (see FIG. 2). The display operating unit 7 displays a finished image, a frame-line collection image, etc. on the display screen 7a. The finished image is a result of a finished image process by the image processing unit 5 on an image file from the image storing unit 4, and the frame-line collection image is given as a page structure image showing the overall page structure of the finished image. The display operating unit 7 also displays a variety of setting buttons, etc. needed for process setting. When the touch panel is touched for operation according to such a display on the display screen 7a, position information of a touched spot is reported to the control unit 2.

Figure 2:
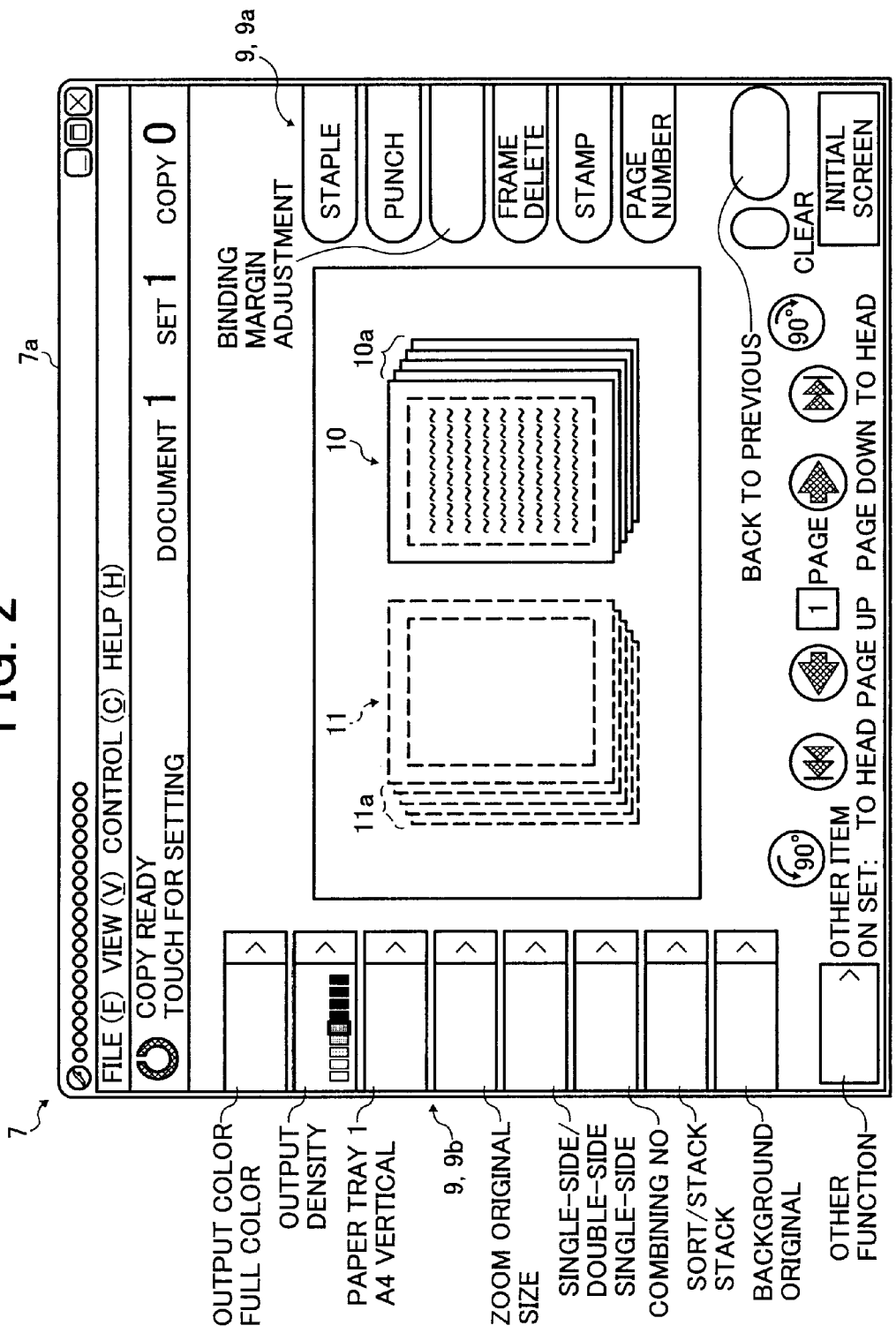
FIG. 2 is a front view of one example of display on a display screen of a display operating unit.

FIG. 2 is a model view of one example of display on the display screen 7a of the display operating unit 7. Process subject images (finished images) 10, 11 and function setting items (menu items) 9 are displayed on the display screen 7a of the display operating unit 7. The function setting items (menu items) 9 includes a menu 9a made up of menu items of staple, punch, binding margin adjustment, frame delete, stamp, page number, etc., execution of which depends on a place on the process subject images (finished images) 10, 11. The menu 9a is displayed at the right on the display screen 7a. The function setting items 9 also includes a menu 9b made up of menu items of output color, output density, paper, zoom, single-side/double-side, combining, sort/stack, background, etc., execution of which does not depend on image contents. The menu 9b is displayed at the left on the display screen 7a.

Upon receiving a report on touch position information, the control unit 2 executes a command process corresponding to the touch position.

As described above, the image processing unit 5 carries out an image process according to setting contents set at the display operating unit 7. The image processing unit 5 also generates a finished image, which represents an image that has been printed out by the printing unit 6 in a specific condition according to setting contents set at the display operating unit 7 and that has subsequently undergone a post-process in a specific post-process condition according to process setting made at the display operating unit 7. In addition, the image processing unit 5 generates a frame-line collection image as a page structure image showing the overall page structure of the finished image.

The image processing unit 5 sequentially carries out an image process on image data on each page of a process subject image file stored in the image storing unit 4 according to process setting at the display operating unit 7, and makes a finished image 10 (see FIG. 2), which represents an image that results when a print process and a post-process according to setting contents at the display operating unit 7 are carried out on the image data subjected to the image process by the image processing unit 5 (finished-image generating unit). The control unit 2 stores the finished image 10 made by the image processing unit 5 in the image storing unit 4. The finished image 10 represents an image that has been subjected to the image process by the image processing unit 5 according to the setting contents at the display operating unit 7, that has been subjected to the print-out process by the printing unit 6 on the image having undergone the image process according to the setting contents at the display operating unit 7, and that has been subjected to the post-process by the printing unit 6 according to the setting contents at the display operating unit 7.

After making each page of the finished image 10 for each page of the image file, the image processing unit 5 lines up each page of the finished image 10 in a given direction at every a given interval, that is, for example, lines up each page of the finished image 10 in a shifted arrangement to the right of the finished image 10. This means that the image processing unit 5 makes a frame-line collection image 10a (see FIG. 2) sidewise at the right of a displayed page, where the frame-line collection image 10a shows page frames that are arranged at every an equal interval in correspondence in number to the pages of the image file (finished-image generating unit). In addition, the image processing unit 5 makes a paged finished image 11 (see FIG. 2), which shows the state of the finished image 10 at the point that a page of the finished image 10 has been turned by the paging operation, and also makes a frame-line collection image 11a (see FIG. 2), which shows the page frames that correspond in number to turned pages represented by the paged finished image 11 and that are arranged sidewise at every an equal interval at the left of the paged finished images 11 (finished-image generating unit). The frame-line collection image 10a, the paged finished image 11, and the frame-line collection image 11a, which are made by the image processing unit 5, are stored in the image storing unit 4. The paged finished image 11 is, for example, an image representing a turned over paper recording an image thereon. When the finished image 10 results from double-side printing for printing images on both sides of a paper, the paged finished image 11 shows an image on the back side of the paper bearing double-side images.

The finished image 10 obtained from the image file through a finishing process may have many pages, which increases the number of the frame lines of the frame-line collection images 10a, 11a to make it impossible to display the frame-line collection images 10a, 11a within the display screen 7a, or render a page specifying operation difficult. In such a case, a page moving number assigned to one frame line is not assigned as one page, but as a plurality of pages of two, three, etc. Specifically, the page moving number is assigned as a proportional number of pages given in consideration of the total page number of a finished image and operability in specifying a page. When the page moving number assigned to one frame line is assigned as a plurality of pages, the image processing unit 5 assigns the page moving number of one page to the innermost frame line of each of the frame-line collection images 10a, 11a so that one page is turned forward or backward to the next page or to the previous page.

The control unit 2, as described above, delivers the finished image 10, the frame-line collection image 10a thereof, the necessary paged finished image 11, and the frame-line collection image 11a thereof, which are made by the image processing unit 5 and are stored in the image storing unit 4, to the display operating unit 7. As shown in FIG. 2, the control unit 2 then causes the display operating unit 7 to display the finished image 10, the frame-line collection image 10a thereof, the necessary paged finished image 11, and the frame-line collection image 11a thereof, on the display screen 7a (finished-image display unit). The control unit 2 normally causes the display operating unit 7 to display the first page of the finished image 10 on an initial display screen for the finished image 10.

On the display screen shown in FIG. 2, the pages of a process subject file stored in the image storing unit 4 is turned to the middle of the file, and a page of the finished image 10 for one page at the middle of the file is displayed. At the right of the finished image 10, the frame-line collection image 10a is displayed, which consists of frame lines corresponding in number to the rest of the unturned pages of the image file. Also displayed on the display screen is the paged finished image 11 which shows a blank back face indicating a turned page, that is, the paged finished image 11 which is given when no back face image is produced. At the left of the paged finished image 11, the frame-line collection image 11a is displayed, which consists of frame lines corresponding in number to the turned pages of the image file. The finished image 10 does not necessarily represent only one page, but may represent spread two pages. In such a case, the paged finished image 11 becomes unnecessary.

The touch panel of the display operating unit 7 is arranged on the display screen 7a of the display operating unit 7. When an operator touches the panel at a desired position (coordinates) on the finished image 10, the control unit 2 displays a given number of process setting items on the display screen 7a of the display operating unit 7, where the setting items have been preset at the position on the finished image 10 that corresponds to the touch position. When a preset value is given to a setting item selected from the process setting items, the control unit 2 causes the image processing unit 5 to execute again a necessary image process and finished image making process on the basis of the selected process setting, and causes the display operating unit 7 to display a remade finished image 10 on the display screen 7a in the manner as described above. These touch operation on the finished image 10, setting operation for the process setting, and remaking and display of the finished image 10 according to the newly set process setting are carried out sequentially.

When a user sees the finished image 10 and presses a start key (not shown) indicating the start of copying on the display operating unit 7, the control unit 2 reads an image file, which is subjected to an image process according to a finally set process setting, out of the image storing unit 4, and delivers the image file to the printing unit 6. The printing unit 6 prints out an image on a paper in a print condition according to the finally set process setting, and carries out a post-process on the paper bearing the printed image in a post-process condition according to the finally set process setting.

The effect obtained from the present embodiment will now be described. The image processing apparatus 1 according to the present embodiment displays a finished image of an image file consisting of a plurality of pages in such a way that moving from a displayed page to a target page of the finished image can be carried out quickly.

A page moving unit is described for a case where a user touches a frame line corresponding to a target page on the touch panel on the frame-line collection images 10a, 11a displayed on the display screen 7a as the user displays the finished images 10, 11 and carries out a process setting operation. In this case, the control unit (page moving unit) 2 detects a page corresponding to a touch position by calculating the order in line-up of the touched frame line from the innermost frame line on the basis of the page moving number assigned to the touched frame line, retrieves a page of the finished image 10 for the target page corresponding to the detected page from the image storing unit 4, and causes the display operating unit 7 to display the retrieved page of the finished image 10 on the display screen 7a. The control unit 2 then informs the image processing unit 5 of the target page to cause the image processing unit 5 to make new frame-line collection images 10a, 11a on the basis of remaining unturned pages and turned pages resulting from opening of the target page. The newly made frame-line collection images 10a, 11a are displayed on the display screen 7a.

To turn forward or turn backward only one page, a user touches the innermost frame line of the frame-line collection image 10a or 11a. When the innermost frame line of the frame-line collection image 10a or 11a is touched, the control unit 2 judges only one-page paging forward or backward operation has been carried out, and reads a page of the finished image 10 or 11, which is the next or previous page to the currently displayed page, out of the image storing unit 4 to display the read out page of the finished image 10 or 11 on the display screen 7a. Subsequently, the control unit 2 causes the image processing unit 5 to remake necessary frame-line collection images 10a, 11a, and display the remade frame-line collection images 10a, 11a on the display screen 7a.

Figure 3:
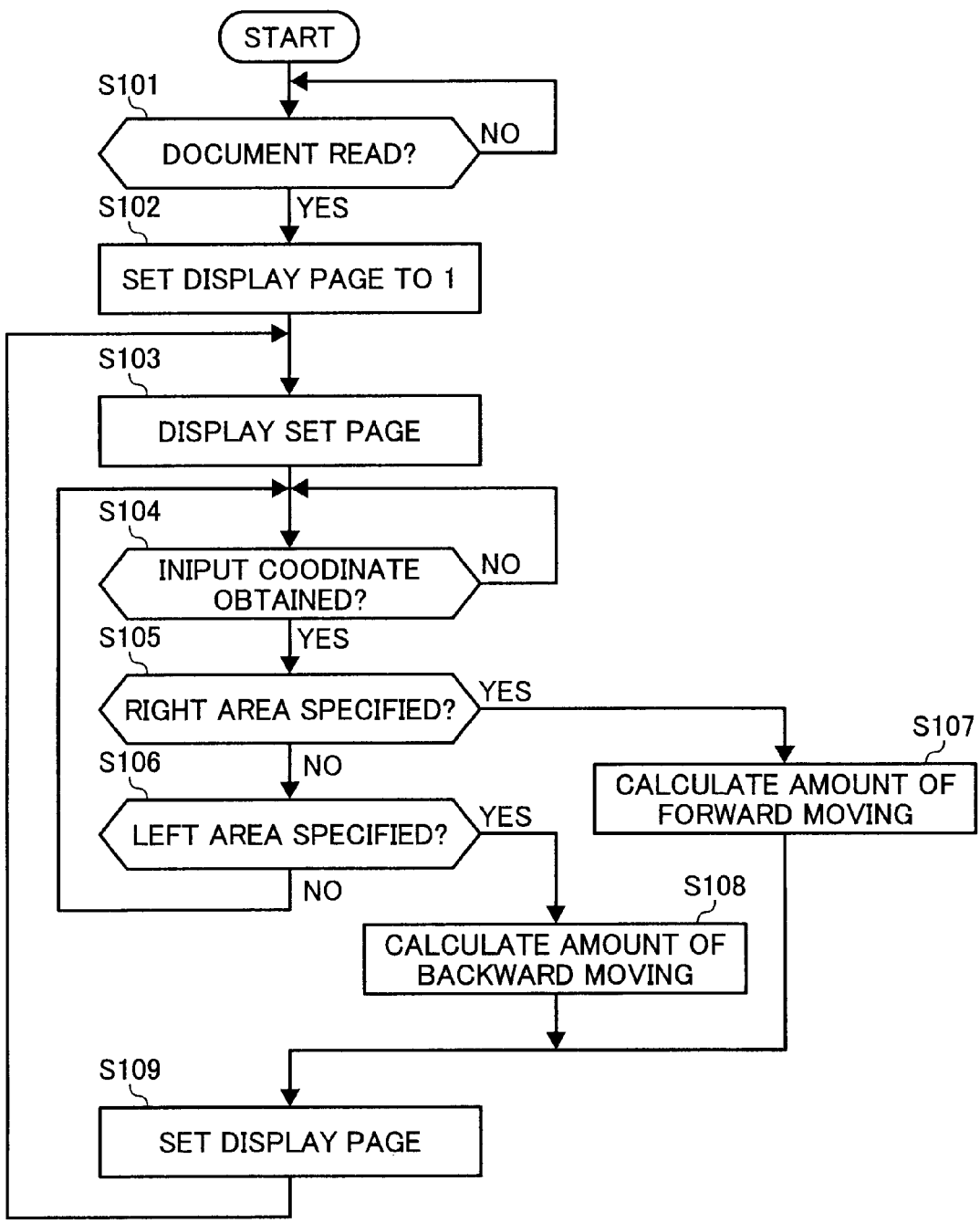
FIG. 3 is a flowchart of the procedure flow of an image display process executed when page-to-page moving is carried out.

Image display processes executed by the image processing apparatus 1 includes an image display process that is executed when the page moving is carried out by specifying areas formed both at left/right of a displayed page. Such an image display process is described with reference to a flowchart shown in FIG. 3. As shown in FIG. 3, at the start of the flowchart, the image processing apparatus 1 drives the image reading unit 3 and waits for reading of documents by the image reading unit 3 (step S101). Specifically, when a user sets a plurality of documents on the ADF of the image reading unit 3 for copying, makes necessary process setting for every process setting item on the display operating unit 7, and presses the start key, the image processing apparatus 1 drives the image reading unit 3 so that the documents are sent one by one from the ADF to the image reading unit 3, which reads images on the documents sequentially. The control unit 2 stores the document image data read by the image reading unit 3 in the image storing unit 4. When all document image data are read, the control unit 2 manages all document image data as one process subject file.

When the documents are read (Yes at step S101), the image processing apparatus 1 sets a displayed page to an initial value "1" (step S102), and displays a set page (finished image and frame-line collection image) on the display screen 7a of the display operating unit (display unit) 7 (step S103).

When a desired coordinate on the displayed set page (finished image and frame-line collection image) is specified via the display operating unit (display unit) 7 to allow the image processing apparatus 1 to obtain an input coordinate (Yes at step S104), the image processing apparatus 1 judges on which of the right/left areas is specified (step S105, S106).

Upon judging that the right area has been specified on the basis of the input coordinate (Yes at step S105), the image processing apparatus 1 calculates the amount of forward moving (step S107), sets a page to display based on the direction (forward) and amount of moving (step S109), and displays a new set page (finished image and frame-line collection image) on the display screen 7a of the display operating unit (display unit) 7 (step S103).

Upon judging that the left area has been specified on the basis of the input coordinate (Yes at step S106), the image processing apparatus 1 calculates the amount of backward moving (step S108), sets a page to display based on the direction (backward) and amount of moving (step S109), and displays a new set page (finished image and frame-line collection image) on the display screen 7a of the display operating unit (display unit) 7 (step S103).

Thus, the image processing apparatus 1 determines an amount of moving based on a position coordinate in the left/right areas, and decides on whether to turn forward or turn backward a page depending on which of the left/right areas has been specified.

When the finished image 10 consists of a plurality of pages, the image processing apparatus 1 displays the finished image 10 with the pages stacked up on the display screen 7a upon displaying the finished image 10 on the display screen 7a of the display operating unit 7 after producing the finished image 10 by carrying out a variety of processes on a process subject image according to setting contents. The image processing apparatus 1 also displays a page structure image showing the overall page structure of the finished image 10. The page structure image is displayed as frame-line collection images 10a, 11a, which are images of collection of a given number of frame lines each representing the number of pages in a given proportion to the total page number of the finished images 10, 11. When a specifying operation is executed on the frame-line collection image 10a or 11a by touching the touch panel of the display operating unit 7, the image processing apparatus 1 carries out the page moving from a currently displayed page to a page specified by the specifying operation on the frame-line collection images 10a, 11a.

The image processing apparatus 1, therefore, allows a user to carry out the page moving from a displayed page to a desired target page by a simple operation while checking the overall page structure of the finished image 10. This enables simple and quick paging operation and checking on the finished image 10 to offer improved usability.

According to the image processing apparatus 1 of the present embodiment, the image processing unit 5 generates a finished image having finished through a series of processes according to setting contents, which includes the image process, printing out of an image having undergone the image process, and the post-process on the paper bearing the printed image. The image processing unit 5 provides such a finished image as the finished image 10.

A user, therefore, is allowed to check the finished image 10 for the result of the series of processes, thus allowed to execute a specific setting operation to obtain an intended process result.

The image processing apparatus 1 of the present embodiment restructures the frame-line collection images 10a, 11a to give them a page structure having a displayed page of a destination page and displays the restructured frame-line collection images 10a, 11a when the page moving from a currently displayed page to a page specified by a specifying operation is carried out.

The frame-line collection images 10a, 11a restructured in accordance with the page moving allows proper understanding of the overall page structure of the finished image 10, which offers further improved usability.

According to the image processing apparatus 1, the frame-line collection images 10a, 11a are composed of collected frame lines that are located diagonally below in parallel with the finished images 10, 11, where the upper and lower sides of the frame lines are also parallel with the finished images 10, 11. When any one of the upper, lateral, and lower sides of one of the collected frame line is touched, the page moving to a page assigned to the touched frame line results. A graphic expression of the frame-line collection images and a function given to the frame lines composing frame-line collection images, however, are not limited to the expression and function that are described above.

Figure 4:
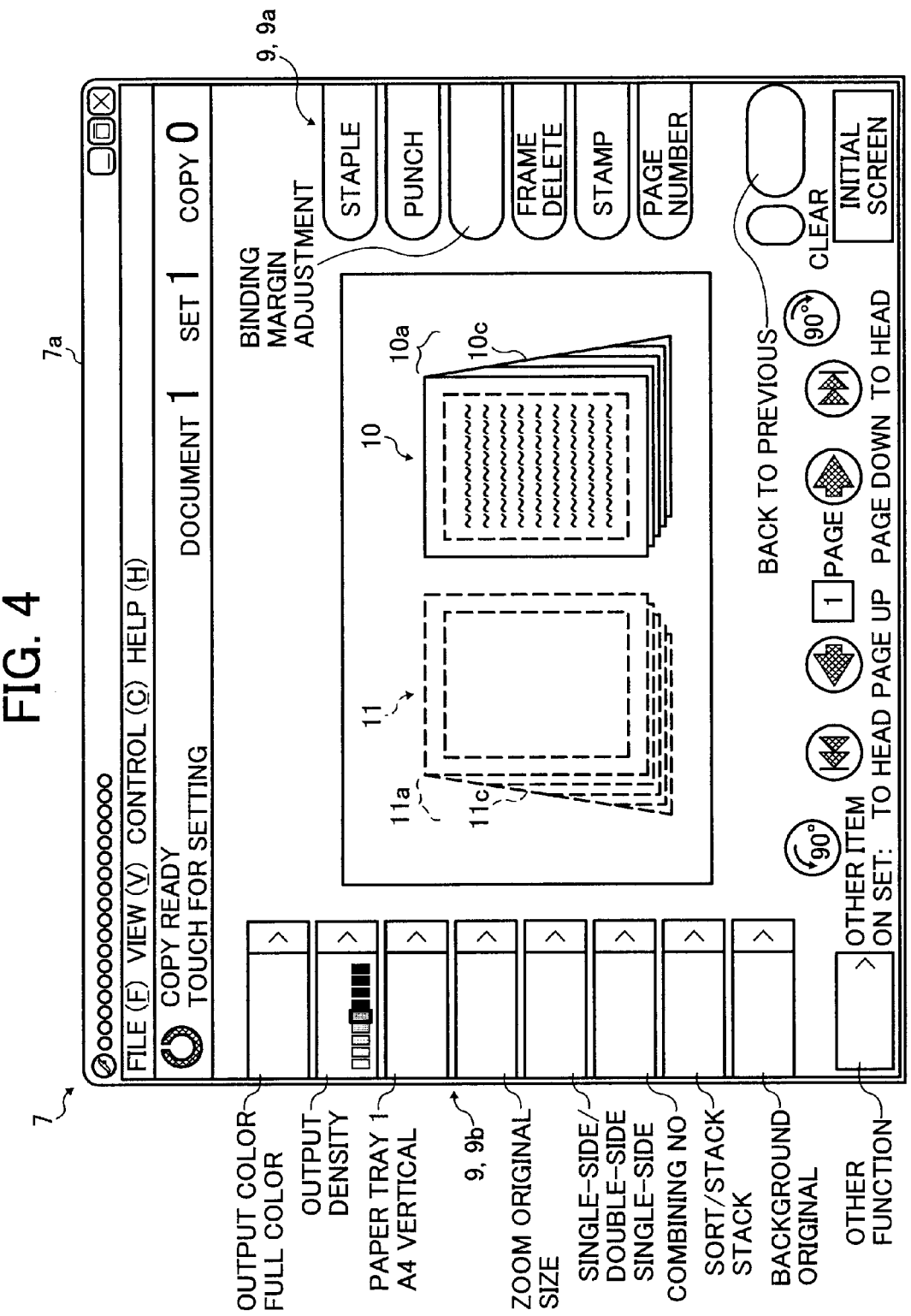
FIGS. 4 to 8 are front views of examples of a display on the display screen of the display operating unit.

For example, sloped frame lines 10c, 11c shown in FIG. 4 are another form of frame lines to be provided. As shown in FIG. 4, the sloped frame lines 10c, 11c are given by sloping down the upper sides of the outermost frames of the frame-line collection images (10a, 11a) shown in FIG. 2 from the frame line side front ends of the upper sides of the finished images 10, 11 so that the sloped lines made by the upper sides of the outermost frames cross the lower sides of the outermost frames. This means that each of the sloped frame lines 10c, 11c forming the frame-line collection image represents the total page number of the finished image 10 (11) in the form of a line segment image extending in a given direction on the periphery of the finished image 10 (11). In this case, one page for paging forward or paging backward is assigned to the innermost frame line for use in only one-page paging forward or paging backward. The page moving numbers for the frame lines other than the innermost frame line are assigned in consideration of the total page number of an image file and operability in specifying a page. On each of the sloped frame lines 10c, 11c constituting an elongated side, a page assigned to the lateral side of each frame is assigned to the connection point between the sloped frame line and each lateral side. The number of pages between each page assigned at the connection point between the sloped frame line and each frame line lateral side are assigned equally to every line segment between one connection point and another connection point on the sloped frame lines 10c, 11c. This means that pages are assigned to the sloped frame lines 10c, 11c from their tops to be arranged in such a proportion that the length of each of the sloped frame lines 10c, 11c corresponds to the total page number of the finished image 10. In this arrangement, the final page or the head page is assigned to the lower side of the outermost frame.

According to the frame-line collection images 10a, 11a shown in FIG. 4, therefore, touching the lateral side or lower side of each frame enables the page moving to a page assigned to a touched frame. In addition, touching the sloped frame line 10c or 11c enables specifying of a page assigned to a touch position on the sloped frame line 10c or 11c. If the touch position is moved while contact with the sloped frame line 10c or 11c is maintained, a specified page can be changed consecutively at short intervals.

In FIG. 4, the frame line lateral sides and frame line lower sides are depicted in a specific number determined by assigning the total page number of the finished image 10 to a given number of frame lines. Another method may be employed to replace these frame line lateral sides and frame line lower sides with light and shade patterns corresponding to the total page number, which are formed in the right triangle drawn by each of the sloped frame lines 10c, 11c and the outermost frame line lower side.

According to the image processing apparatus 1 of the present embodiment, the frame-line collection images 10a, 11a consist of frame lines arranged diagonally below the finished image 10 at equal intervals. The arrangement of frame lines, however, is not limited to the above manner.

Figure 5:
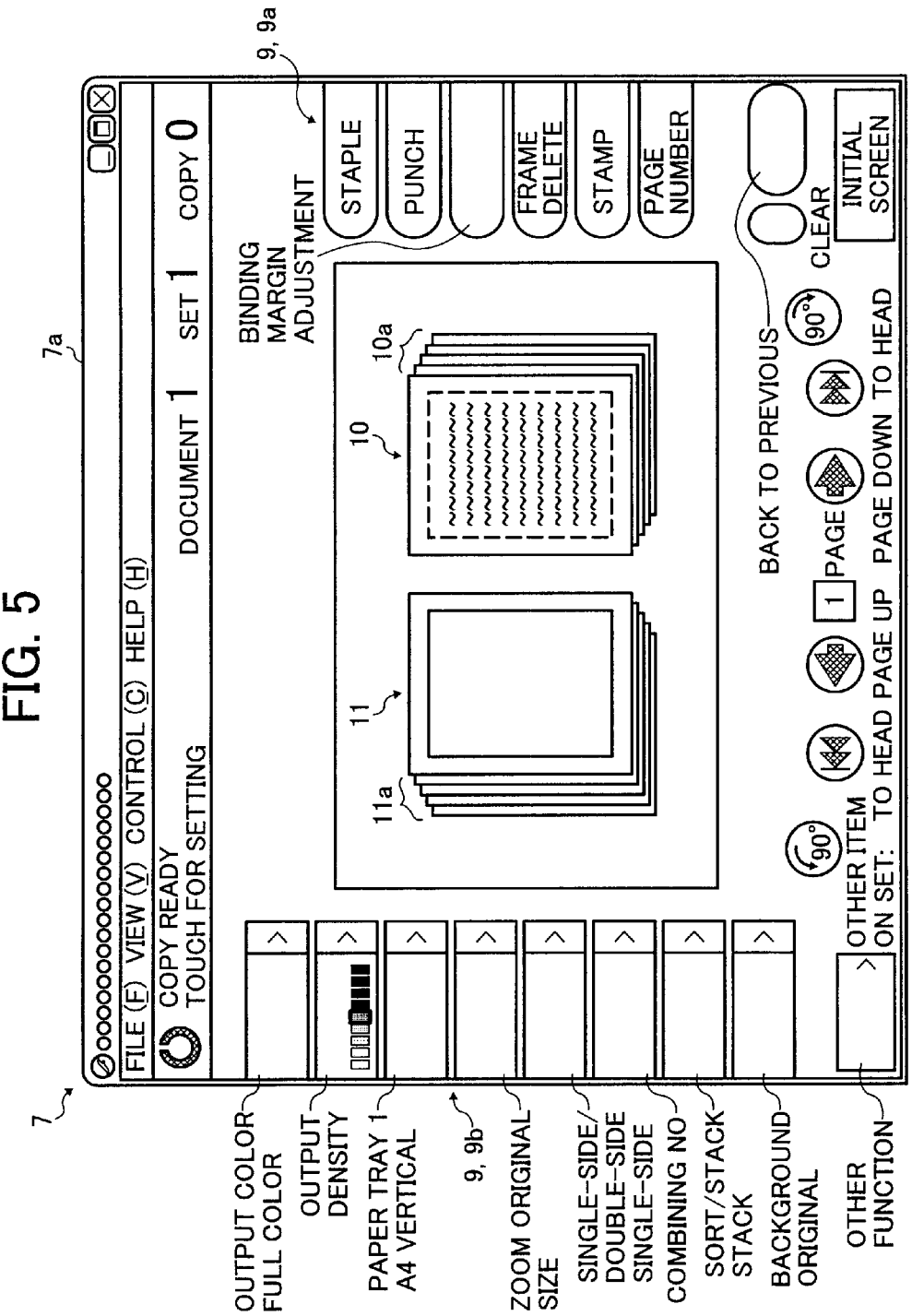

For example, the frames may be arranged in the manner as frame-line collection images 10a, 11a shown in FIG. 5 are arranged. The frames constituting the frame-line collection images 10a, 11a are put in a log-scale arrangement that narrows gaps between the frames exponentially from the inside toward the outside of the frame collection images.

If each frame line of the frame-line collection images 10a, 11a is put in such a log-scale arrangement, touching a frame line becomes easy upon carrying out the page moving from a currently open page to a target page not so far from the open page.

Actual operation of paging forward or paging backward turns out the page moving over a few pages in many cases. A greater number of total pages leads to a greater number of frame lines, which makes an accurate touch to a destination page difficult when the page moving over a couple of pages is carried out.

As shown in FIG. 5, however, when the frames constituting the frame-line collection images 10a, 11a are put in the log-scale arrangement that narrows gaps between the frames exponentially from the inside, where a page close to an open page is specified, toward the outside, where a page far from the open page is specified, of the frame collection images, touching a frame line of a page becomes easier as the page becomes closer to the open page. This contributes to the improvement of operability.

In actual operation of paging forward or paging backward, paging forward or paging backward from a page substantially close to a target page is carried out first, and then the target page in close proximity is specified. The log-scale arrangement allows a user to execute the paging operation at page-to-page operational intervals that correspond to such an actual operation of paging forward or paging backward, thus offers improved usability.

Figure 6:
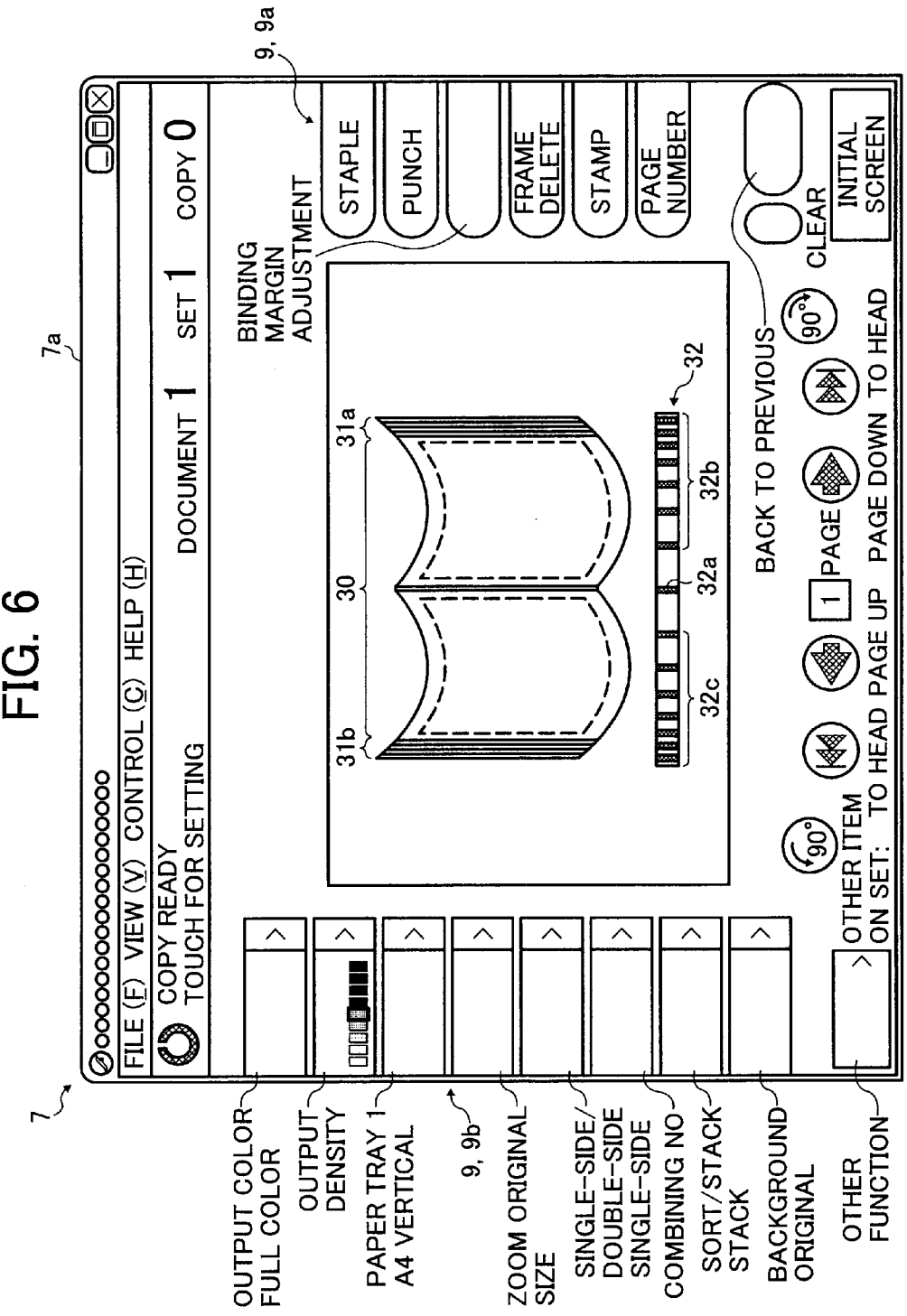

According to the image processing apparatus 1 described above, a page structure image showing the page structure of a finished image is displayed only in the form of the frame-line collection images. The page structure image, however, is not limited only to the form of the frame-line collection images, but may be displayed, for example, in the form as shown in FIG. 6. FIG. 6 exhibits an expected finished image 30 showing spread two pages, frame-line collection images 31a, 31b displayed at both lateral sides of the expected finished image 30, and a guide scale 32 for executing operation of specifying a target page. The guide scale 32 is made by the image processing unit 5, and is displayed under the frame-line collection images 31a, 31b.

The guide scale 32 includes a current-page specifying scale 32a for specifying the current page, which current-page specifying scale 32a is displayed at the lateral center of the guide scale 32, a plurality of paging-forward specifying scales 32*b* for specifying a page for paging forward, and a plurality of paging-backward specifying scales 32*c* for specifying a page for paging backward, the paging-forward and paging-backward specifying scales 32*b*, 32*c* being displayed at both sides of the current-page specifying scale 32*a*. The paging-forward and paging-backward specifying scales 32*b*, 32*c* are provided as scales for directly specifying each page when the total page number of the finished image 30 is small. When the total page number of the finished image 30 is great, on the other hand, one page is assigned as the page moving number to the paging-forward specifying scale 32*b* closest to the current-page specifying scale 32*a*, and to a paging-backward specifying scale 32*c* closest to the current-page specifying scale 32*a* to carry out paging forward or paging backward by only one page to the next page or to the previous page. To the paging-forward specifying scales 32*b* and paging-backward specifying scales 32*c* further outside to the current-page specifying scale 32*a*, however, not one page is assigned but a plurality of pages are assigned. For example, the number of pages to assign is determined to be 2, 10, etc. in consideration of the total page number of the finished image 30 and operability in specifying a page.

The displayed guide scale 32 allows a user to specify a target page by touching a specific spot on the guide scale 32. When a page is specified on the guide scale 32, the control unit 2 reads a specified page of the finished image showing spread two pages from the image storing unit 4, and displays the specified page on the display screen 7*a*. In addition, the control unit 2 sends target page information to the image processing unit 5, causing the image processing unit 5 to remake the image of the guide scale 32 into a new image of the guide scale 32 having the restructured scale arrangement of the paging-forward specifying scales 32*b* and paging-backward specifying scales 32*c*, the scale arrangement being restructured based on the position of the target page in the overall page structure of the finished image. The remade guide scale 32 is displayed on the display screen 7*a*.

The arrangement of the paging-forward and paging-backward specifying scales 32*b*, 32*c* of the guide scale 32 is not limited to the equal interval arrangement of each scale. The scales may be put in a log-scale arrangement as shown in FIG. 5, where scale gaps become wider as the scales come closer to the current-page specifying scale 32*a*, while becomes narrower as the scale become farther away from the current-page specifying scale 32*a*.

This log-scale arrangement facilitates page specifying operation on the paging-forward specifying scale 32*b* and paging-backward specifying scale 32*c* for a page close to a currently open page.

In another method of display, the color of the paging-forward and paging-backward specifying scales 32*b*, 32*c* may be changed when the page moving from a displayed page is carried out.

This facilitates understanding of the page arrangement indicated by the paging-forward and paging-backward specifying scales 32*b*, 32*c*.

Figure 7:
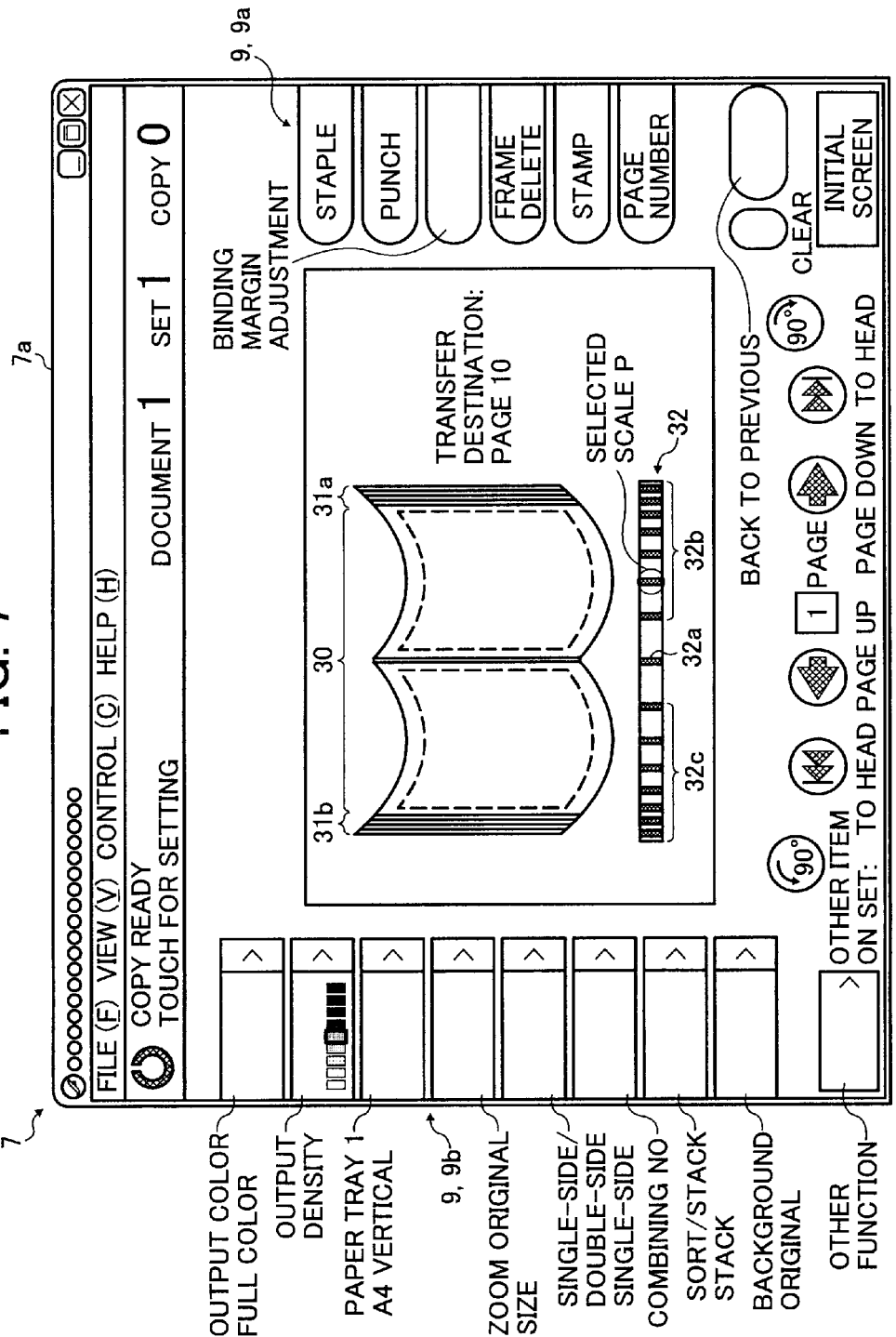
Figure 8:
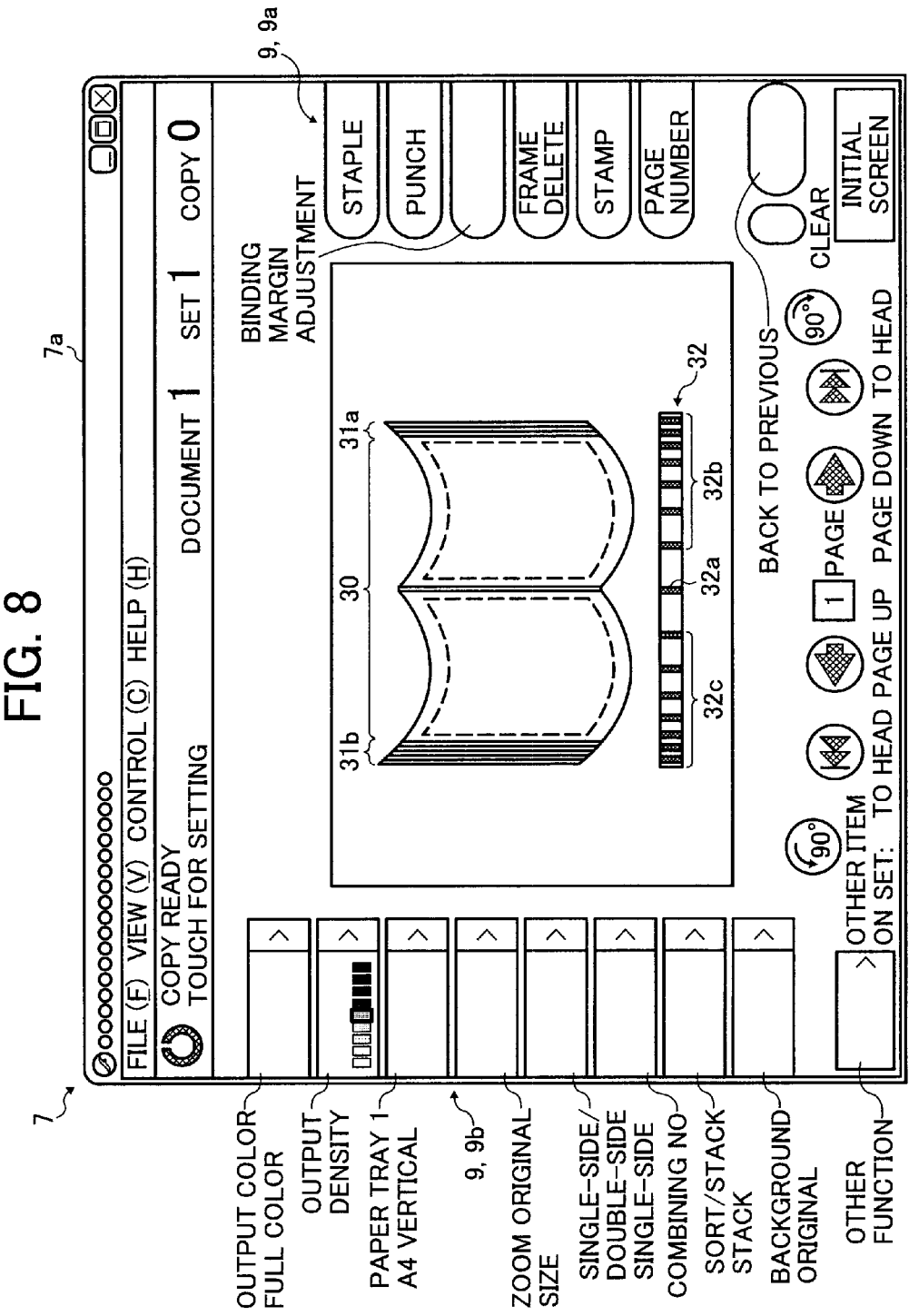

A page structure image showing the page structure of a finished image is not limited to the form of the frame-line collection images and the guide scale 32, but may be displayed, for example, in the form as shown in FIG. 7. FIG. 7 exhibits the guide scale 32 operating in such a way that when a page specifying operation (touch operation) is carried out on any one of the scales 32*a*, 32*b*, 32*c*, a destination page, which is specified by a page assigned to one of the scales 32*a*, 32*b*, 32*c* where the page specifying operation is carried out, is displayed in characters. In FIG. 7, one of the paging-forward specifying scales 32*b* on the guide scale 32 is displayed as a selected scale P. When a page specifying operation is carried out on one of the paging-forward specifying scales 32*b*, "destination: page 10" is displayed as character information notifying a destination page specified by such a selected scale.

The paging operation using the guide scale 32 is carried out in the following manner.

When the touch panel on the guide scale 32 on the display screen 7*a* is touched, the number of pages for paging forward or paging backward or a page number to the total page number of the finished image 30 (display instance shown in FIG. 6) is displayed according to a touch position. When the touch position on the touch panel on the guide scale 32 is moved to the left/right while contact with the panel is maintained, the image processing apparatus 1 changes the number of pages displayed in figures according to the touch position (specifying position) on the guide scale 32 changing in response to the movement of the touch position. Thus, a page displayed in figures represents a target page.

When a user removes his or her finger from the touch panel, the control unit 2 reads a page of the finished image at the target page out of the image storing unit 4, and displays the read page of the finished image as the finished image 30 on the display screen 7*a*.

As described above, the image processing apparatus 1 changes the number of pages displayed in figures according to the touch position (specifying position) on the guide scale 32 changing in response to the movement of the touch position when the touch position on the touch panel on the guide scale 32 is moved to the left/right while the contact with the panel is maintained. On the other hand, when the touch position is not moved and kept stopped for a preset stand-by time, the control unit 2 judges the stopped touch position to be a position for specifying a destination page, and changes a screen display from a state shown in FIG. 7 to a state shown in FIG. 8. Specifically, upon recognizing a page specified at the stopped position as a target page, the control unit 2 reads a page of the finished image at the target page out of the image storing unit 4, and displays the read page of the finished image as the finished image 30 on the display screen 7*a*. At the same time, the control unit 2 changes the display of the frame-line collection images 31*a*, 31*b* and the guide scale 32 into a display according to the page moving to the target page. When the touch position on the touch panel on the guide scale 32 is moved to the left/right without releasing the contact with the panel to be brought to a stop and the display of the finished image 30 is changed according to the destination page specified at the stopped position, the image processing apparatus 1 also changes the display of the guide scale 32 into such a display that the scales 32*b*, 32*c* enabling the page moving per page are arranged at the left/right of the guide scale center to which the destination page is assigned. This change is made to enable the page moving at short intervals from the destination page at the center.

The above arrangement allows a user to execute continuous page specifying operation smoothly while checking the finished image 30 to appear, thus offers further improved usability.

According to the description made so far, the image processing unit 5 generates pages of finished images in advance for images of all pages of process subject data (document image data) stored in the image storing unit 4, and stored the pages of finished images in the image storing unit 4. When a page is specified, the control unit 2 reads a page of the finished image out of the image storing unit 4, and displays the read page of the finished image on the display screen 7*a* of the display operating unit 7. Finished image making is, however, not limited to premaking of all pages of the finished image.

For example, in another finished image making process, only the finished image of a page displayed in an initial state is generated first and is stored in the image storing unit 4. Afterward, when a page is specified, the control unit 2 causes the image processing unit 5 to generate a finished image of the specified target page, places the finished image in storage in the image storing unit 4, and then displays the finished image on the display screen 7*a* of the display operating unit 7.

Figure 9:
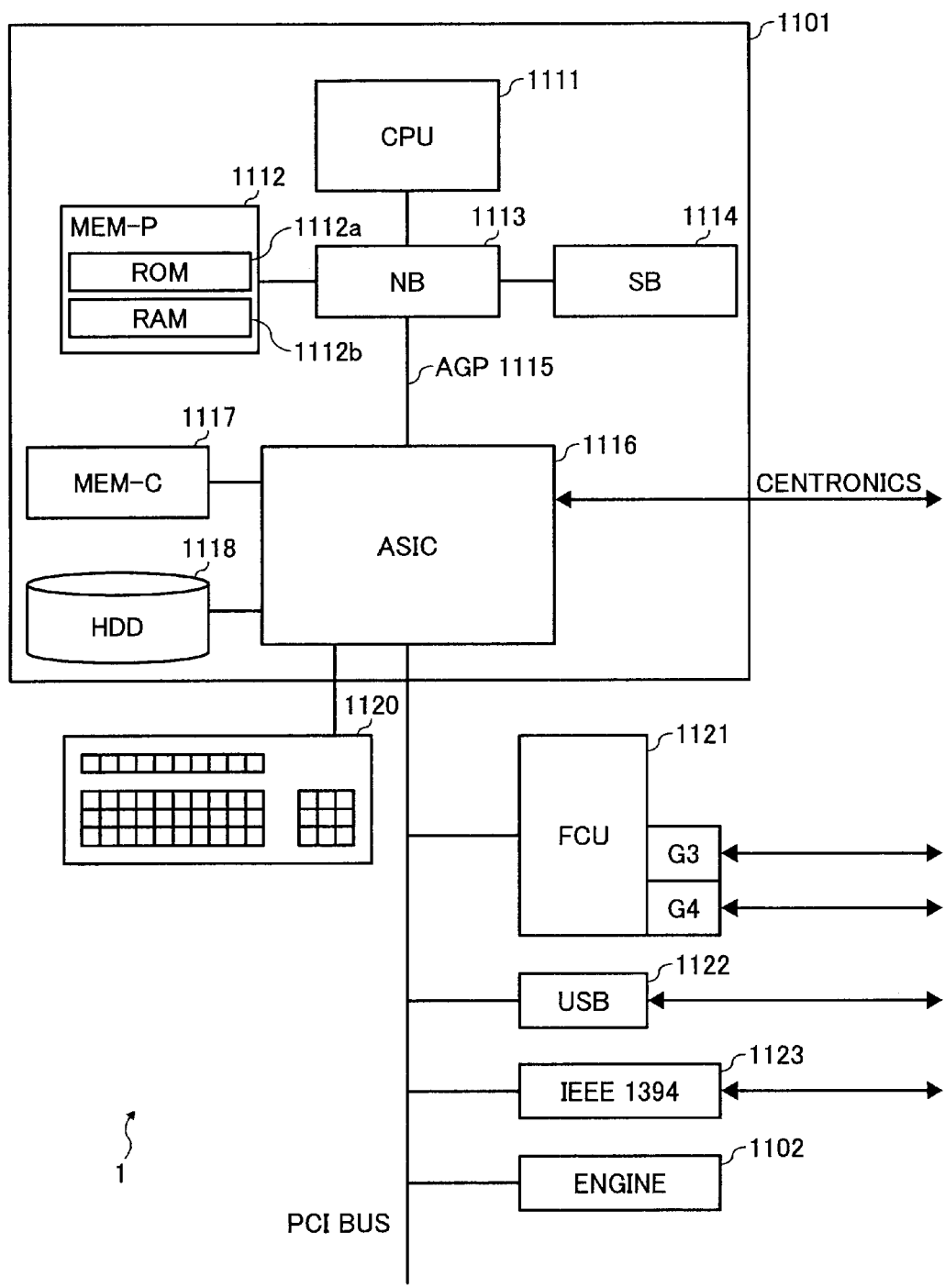
FIG. 9 is a block diagram of the hardware configuration of the image processing apparatus.

FIG. 9 is a block diagram of the hardware configuration of the image processing apparatus 1 according to the present embodiment. The image processing apparatus 1 is constructed as an MFP having multiple functions of faxing, scanning, etc. As shown in FIG. 9, the image processing apparatus 1 includes a controller 1101, and an engine unit 1102, which are interconnected via a peripheral component interconnect (PCI) bus. The controller 1101 controls the overall operation of the image processing apparatus 1, and also controls graphic performance, communication, and input from an operating unit 1120. The engine unit 1102 is such a printer engine connectible to the PCI bus as black/white plotter, 1-drum color plotter, 4-drum color plotter, scanner, or fax unit. In addition to an engine portion, such as plotter, the engine unit 1102 also includes an image processing portion serving for error diffusion or gamma conversion.

The controller 1101 has a CPU 1111, a system memory (MEM-P) 1112, a north bridge (NB) 1113, a south bridge (SB) 1114, an application-specific integrated circuit (ASIC) 1116, a local memory (MEM-C) 1117, and a hard disc drive (HDD) 1118. The NB 1113 is connected to the ASIC 1116 via an accelerated graphics port (AGP) bus 1115. The MEM-P 1112 has a ROM 1112*a*, and a RAM 1112*b*.

The CPU 1111 executes general control over the image processing apparatus 1, and has a chip set composed of the NB 1113, the MEM-P 1112, and the SB 1114. The CPU 1111 is connected to other units via the chip set.

The NB 1113 is a bridge that connects the CPU 1111 to the MEM-P 1112, to the SB 1114, and to the AGP bus 1115. The NB 1113 has a memory controller controlling reading/writing on the MEM-P 1112, a PCI master, and an AGP target.

The MEM-P 1112 is a system memory used for storing programs and data, for developing programs and data, for graphic operation by a printer, etc. The MEM-P 1112 consists of the ROM 1112*a*, and the RAM 1112*b*. The ROM 1112*a* is a read-only memory used for storing programs and data that controls the operation of the CPU 1111. The RAM 1112*b* is a readable/writable memory used for developing programs and data, for graphic operation by a printer, etc.

The SB 1114 is a bridge that connects the NB 1113 to PCI devices and peripheral devices. The SB 1114 is connected to the NB 1113 via the PCI bus, to which a network interface (I/F) unit is connected.

The ASIC 1116 is an integrated circuit (IC) for use in image processing, and has a hardware element for image processing. The ASIC 1116 plays a role as a bridge that interconnects the AGP bus 1115, the PCI bus, the HDD 1118, and the MEM-C 1117. The ASIC 1116 includes a PCI target, an AGP master, an arbiter (ARB) constituting the kernel of the ASIC 1116, a memory controller that controls the MEM-C 1117, a plurality of direct memory access controllers (DMACs) that rotate image data using a hardware logic, and a PCI unit that executes data transfer between the PCI unit and the engine unit 1102 via the PCI bus. The ASIC 1116 is connected to a fax control unit (FCU) 1121, to a universal serial bus (USB) 1122, and to an IEEE 1394 (the Institute of Electrical and Electronics Engineers 1394) I/F 1123 via the PCI bus.

The MEM-C 1117 is a local memory used as an image buffer for copying and as a code buffer. The HDD 1118 is a storage that accumulates image data, programs controlling the operation of the CPU 1111, font data, and forms.

The AGP bus 1115 is a bus I/F for a graphic accelerator card that is proposed to speed up graphic processes. The AGP bus 1115 provides direct access to the MEM-P 1112 at high throughput to allow high-speed performance of the graphic accelerator card.

The operating unit 1120 connected to the ASIC 1116 receives operational input from an operator, and sends information of the received operational input to the ASIC 1116.

An image displaying program and an image forming program executed by the image processing apparatus 1 of the present embodiment are preinstalled in the ROM, etc., and are provided for execution.

The image displaying program and image forming program executed by the image processing apparatus 1 of the present embodiment may be recorded on a computer-readable recording medium, such as a CR-ROM, a flexible disc (FD), a CD-R, or a digital versatile disc (DVD), as a file in an installable format or an executable format, and be provided for execution.

The image displaying program and image forming program executed by the image processing apparatus 1 of the present embodiment may be stored in a computer connected to a network, such as the Internet, and be downloaded via the network for execution. The image displaying program and image forming program executed by the image processing apparatus 1 of the present invention may be provided or distributed via a network, such as the Internet.

The image processing apparatus 1 of the present embodiment is of a module structure that includes each unit described above (control unit 2, image reading unit 3, image storing unit 4, image processing unit 5, printing unit 6, and display operating unit 7.) As the CPU (processor) reads the image displaying program and image forming program out of the ROM and executes the programs, each unit is loaded into the main memory to generate the control unit 2, image reading unit 3, image storing unit 4, image processing unit 5, printing unit 6, and display operating unit 7 in the main memory.

According to the first embodiment, the image processing apparatus 1 of the present invention is provided in the form of a compound machine called MFP, but the form of the image processing apparatus 1 in a practical application is not limited to such a compound machine. Various effects equal to the effects described above can be obtained by, for example, connecting an image forming device, such as printer, to a personal computer (PC), and installing a given program in a memory unit, such as an HDD, of the PC, then causing the CPU of the PC to operate according to the installed program.

Figure 10:
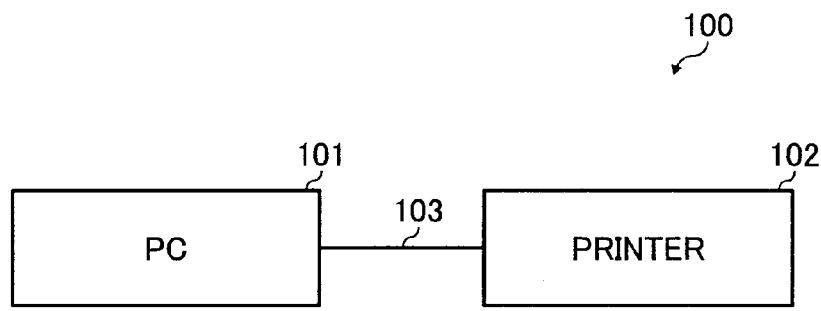
FIG. 10 is a block diagram of a schematic structural example of a printing system according to a second embodiment of the present invention.

FIG. 10 is a block diagram of a schematic structural example of a printing system 100 according to a second embodiment of the present invention. The printing system 100 shown in FIG. 10 includes a PC 101 that sends out a print job including print data and print conditions for printing out the print data, a printer 102 that prints the print data, and a cable 103 that connects the PC 101 to the printer 102.

The PC 101 sends print data corresponding to a prepared document and print condition data set for printing of the document (paper direction, double-side, combining, bookbinding, stapling, punching, zoom, etc.), both data being sent as a print job, to the printer 102.

The printer 102 prints out the print data according to the print job sent from the PC 101. Specifically, the printer 102 prints out the print data included in the print job on a medium, such as paper, according to the print condition data included in the print job (paper direction, double-side, combining, bookbinding, stapling, punching, zoom, etc.).

The specific constitution of the PC 101 and of the printer 102 will now be described in order.

Figure 11:
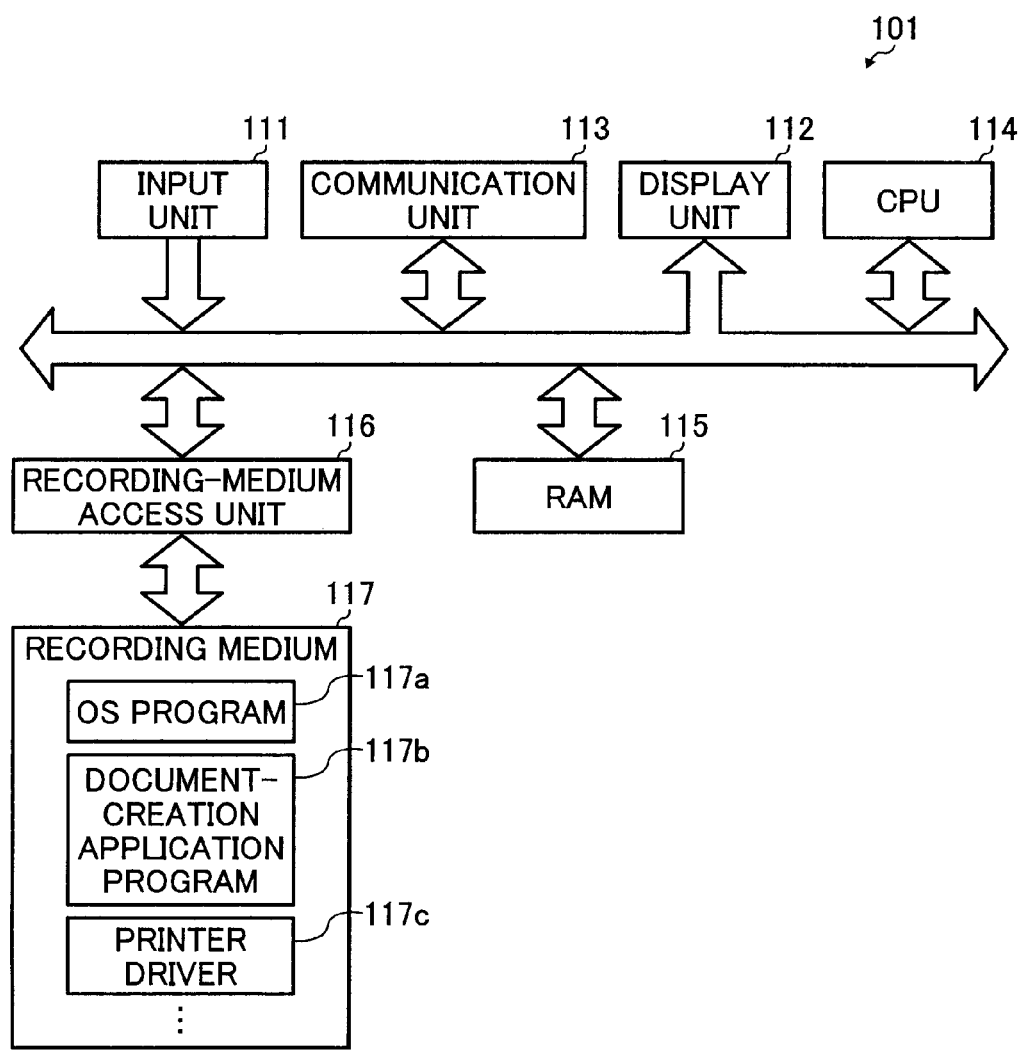
FIG. 11 is a block diagram of the schematic structure of a PC.

FIG. 11 is a block diagram of the schematic structure of the PC 101. As shown in FIG. 11, the PC 101 includes an input unit 111 for data input, a communication unit 113 for data communication, a CPU 114 that executes control over the entire part of the PC 101, a RAM 115 that is used as a work area for the CPU 114, a recording-medium access unit 116 that writes and reads data in and out of a recording medium 117, and the recording medium 117 that stores various programs for operating the CPU 114.

The input unit 111 includes a keyboard having cursor key, numerical input keys, various functional keys, etc., and a mouse or slice pad for selecting a key on the display screen of a display unit 112. The input unit 111 is a user I/F for a user to give the CPU 114 an operational command or input data.

The display unit 112 consists of a CRT or LCD, and makes display according to display data input from the CPU 114. The communication unit 113 handles data communication with external equipment, and executes data communication, for example, with the printer 102, etc. via the cable 103.

The CPU 114 is a central control unit that controls the entire part of the PC 101 according to programs stored in the recording medium 117. The CPU 114 is connected to the input unit 111, to the display unit 112, to the communication unit 113, to the RAM 115, and to the recording-medium access unit 116. The CPU 114 controls data communication, readout of an application program through access to a memory or reading/writing of various data, data/command input, display, etc. The CPU 114 sends print data input from the input unit 111 and print condition data for the print data, both data being sent as a print job, to the printer 102 via the communication unit 113.

The RAM 115 has a work memory that stores a specified program, an input instruction, input data, a process result, etc., and a display memory that temporarily stores display data to be put out on the display screen of the display unit 112.

The recording medium 117 stores various programs and data including an OS program 117a (e.g. WINDOWS™, etc.) that can be executed by the CPU 114, a document-creation application program 117b, and a printer driver 117c operable on the printer 102. The recording medium 117 includes, for example, an optical, magnetic, or electric recording medium, such as an FD, an HD, a CD-ROM, a DVD-ROM, a magneto-optical (MO) disk, and a PC card. The various programs are put in a data format readable to the CPU 114, and are stored in the recording medium 117. The programs are recorded beforehand on the recording medium in some cases, or are downloaded via a communication line and are stored in the recording medium in other cases. The programs can be distributed via the communication line.

Figure 12:
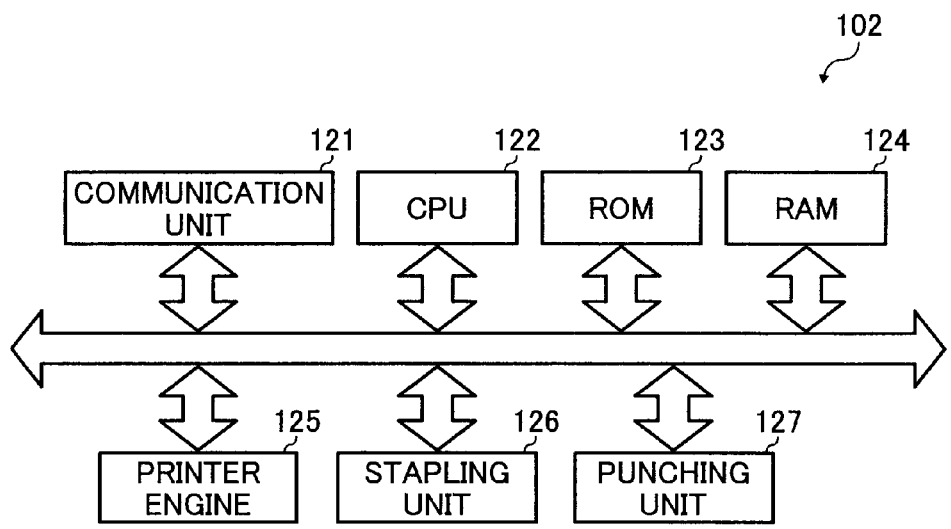
FIG. 12 is a block diagram of the schematic structure of a printer.

FIG. 12 is a block diagram of the schematic structure of the printer 102. As shown in FIG. 12, the printer 102 includes a communication unit 121 that executes data communication, a CPU 122 that executes control over the whole of the printer 102, a ROM 123 that stores various control programs for running the CPU 122, a RAM 124 that temporarily stores print data and print condition data included in a print job, which is input from a work area for the various control programs, from the PC 101, etc., a printer engine 125 that prints the print data on a transfer paper, a stapling unit 126 that staples papers bearing printed print data, and a punching unit 127 that punches a hole on the transfer paper bearing the printed print data. The printer 102 has a double-side function, a punching function, a stapling function, etc.

The communication unit 121 handles data communication with external equipment, and, for example, communicates with the PC 101 through data exchange.

The CPU 122 is a central control unit that controls the entire part of the printer 102 according to the various control programs stored in the ROM 123. The CPU 122 is connected to the communication unit 121, to the ROM 123, to the RAM 124, to the printer engine 125, to the stapling unit 126, and to the punching unit 127. The CPU 122 controls data communication, printer operation, etc.

The ROM 123 stores the various control programs for running the CPU 122, parameters used for processes by the control programs, etc. The RAM 124 has a work memory that stores a specified control program, a process result, received print data, etc.

The printer engine 125 is a printer engine employing an electrophotographic method, which is a unit that prints print data on a transfer paper. The printer 102 may employ various printing methods other than the electrophotographic method, such as ink-jet method, sublimation-type heat transfer method, silver salt photographic method, direct thermographic method, and melt-type heat transfer method.

The printer driver 117c is a software program that is so designed that a program can be run relative to a specific program on the printer 102 without being troubled with the hardware and/or internal language of the printer 102. The printer driver 117c controls the printer 102, and executes output data processing, etc.

Pursuant to the printer driver 117c, the CPU 114 of the PC 101 executes such operations as generation and display of an expected finished image on the basis of print data and print condition data for the print data, both data being input from the input unit 111, and transfer of print data made by the document-creation application program 117b to the printer 102.

Figure 13:
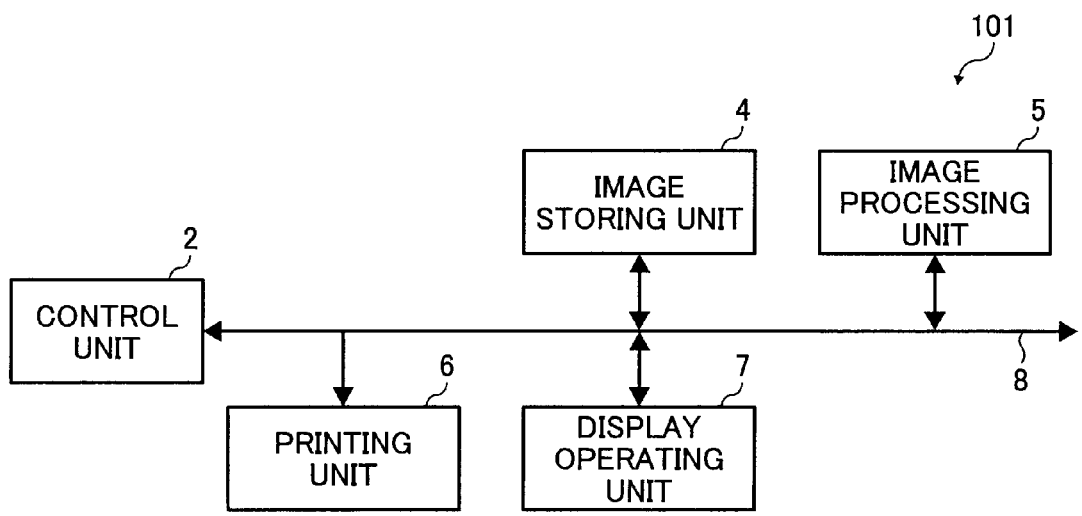
FIG. 13 is a block diagram of the main components of the PC.

As the CPU 114 operates in pursuant to the printer driver 117c, the PC 101 comes to have the control unit 2, the image storing unit 4, the image processing unit 5, the printing unit 6, and the display operating unit 7, as shown in FIG. 13.

The PC 101, therefore, comes to have the same system configuration as that of the image processing apparatus 1 shown in FIG. 1 to offer the same various effects as explained in the first embodiment when the CPU 114 operates in pursuant to the printer driver 117c.

Figure 14:
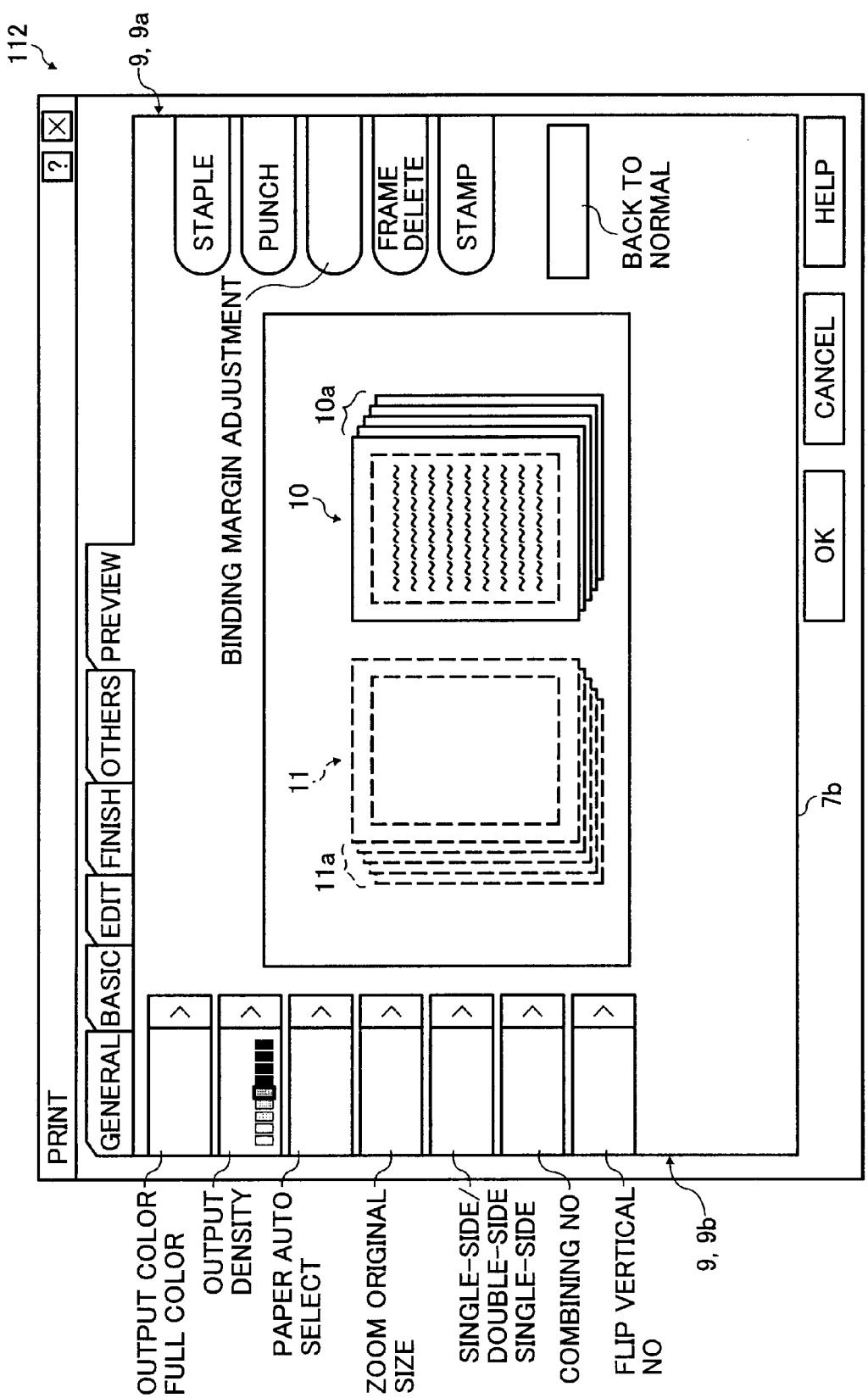
FIG. 14 is a front view of one example of a display screen produced by a printer driver.

FIG. 14 is a front view of one example of a display screen produced by the printer driver 117c. The screen shown in FIG. 14 is a screen that is displayed when the start of the printer driver 117c is selected on a display screen of the document-creation application program 117b, the start screen of the OS program 117a, etc. The screen shown in FIG. 14 allows a selection of a preview setting screen 7b (equivalent to the display screen 7a of the display operating unit 7 of the image processing apparatus 1) for generating/displaying an expected finished image based on print data and print condition data for the print data, both data being sent from the input unit 111, in addition to a selection of a basic condition setting screen, an editing condition setting screen, a finishing condition setting screen, etc.

According to the present embodiment, operation of the CPU 114 of the PC 101 in pursuant to the printer driver 117c results in display of the preview setting screen 7b for generating/displaying an expected finished image based on print data and print condition data for the print data, both data being sent from the input unit 111. The way of displaying the preview setting screen 7b, however, is not limited to the above case. The preview setting screen 7b may be displayed by operating the CPU 114 of the PC 101 in pursuant to the document-creation application program 117b or the OS program 117a.

While the present invention provided by the inventor has been described in detail with reference to the preferred embodiments, the above description is not intended to limit the present invention. Various modifications of the embodiments will be possible as far as the modifications fall within the true scope of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising: a processed-image generating unit that generates a processed image showing a result of a process performed on a target image according to various function setting items; a processed-image display unit that, when the target image extends to a plurality of pages, forms the processed image in a stack, and displays the stacked processed image on a display together with a page structure image that shows an overall page structure of the stacked processed image; and a page moving unit that, when one of the pages constituting the page structure image is specified via an operating unit, executes a page moving from a page currently displayed on the display to the specified page, wherein the page structure image that is displayed is a guide scale image representing all of the plurality of pages, the guide scale image including a predetermined number of scales, each scale being a graphic symbol representing a number of pages in a predetermined proportion to a total page number of pages of the processed image; and the page moving unit executes, when one of the scales on the guide scale image is selected via the operating unit, the page moving from a page currently displayed on the display to a page corresponding to the specified scale.

2. The image processing apparatus according to claim 1, wherein
the processed-image generating unit generates a page-moved processed image indicating that the page moving operation has been performed for the processed image, and
the processed-image display unit forms the page-moved processed image in a stack, and displays the processed image and the stacked page-moved processed image on the display together with a page structure image that shows an overall page structure of the stacked page-moved processed image.

3. The image processing apparatus according to claim 1, wherein
the processed image displayed on the display by the processed-image display unit is in a form of double pages.

4. The image processing apparatus according to claim 1, wherein
the process executed on the target image according to the various function setting items is a series of processes including an image process, a process of recording a processed image on a recording medium, and a post-process on the recording medium on which the image is recorded.

5. The image processing apparatus according to claim 1, wherein
the page structure image is a frame-line collection image showing a collection of a predetermined number of frame lines representing number of pages in a predetermined proportion to a total number pages of the processed image at a periphery of the processed image, and
the page moving unit executes, when one of the frame lines constituting the frame-line collection image is specified via the operating unit, the page moving from a page currently displayed on the display to a page corresponding to the specified frame line.

6. The image processing apparatus according to claim 5, wherein the frame-line collection image represents the total page number of the processed image in a form of a line segment image that extends in a predetermined direction at the periphery of the processed image.

7. The image processing apparatus according to claim 5, wherein
the frame lines constituting the frame-line collection image are arranged in a log-scale that narrows intervals between adjacent frame lines exponentially from inside toward outside of the frame-line collection image.

8. The image processing apparatus according to claim 1, wherein the scales on the guide scale image are arranged in a log-scale that narrows intervals between adjacent scales exponentially from inside toward outside of the guide scale image.

9. The image processing apparatus according to claim 1, wherein
upon executing the page moving from the page currently displayed on the display to the specified page, the processed-image display unit restructures the page structure image to give the page structure image a new page structure indicating a new overall page structure of the processed image after the page moving, and displays the restructured page structure image on the display.

10. The image processing apparatus according to claim 1, wherein
upon executing the page moving from the page currently displayed on the display to the specified page, the processed-image display unit displays destination page information on a destination page on the display.

11. The image processing apparatus of claim 1, wherein the processed-image display unit displays the guide scale image below the stacked processed image.

12. A non-transitory computer readable medium having computer readable program codes embodied in the medium that when executed causes a computer to execute: generating a processed image showing a result of a process performed on a target image according to various function setting items; processed-image displaying including, when the target image extends to a plurality of pages, forming the processed image in a stack; and displaying the stacked processed image on a display together with a page structure image that shows an overall page structure of the stacked processed image; and executing, when one of the pages constituting the page structure image is specified via an operating unit, a page moving from a page currently displayed on the display to the specified page wherein the displaying step includes displaying a guide scale image representing all of the plurality of pages, the guide scale image including a predetermined number of scales, each scale being a graphic symbol representing a number of pages in a predetermined proportion to a total page number of pages of the processed image; and the executing step includes, when one of the scales on the guide scale image is selected via the operating unit, the page moving from a page currently displayed on the display to a page corresponding to the specified scale.

* * * * *